(12) United States Patent
Sugihara et al.

(10) Patent No.: US 11,322,276 B2
(45) Date of Patent: May 3, 2022

(54) WIRE HARNESS

(71) Applicant: SUMITOMO WIRING SYSTEMS, LTD., Yokkaichi (JP)

(72) Inventors: Sei Sugihara, Yokkaichi (JP); Toshiya Ota, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/196,367

(22) Filed: Mar. 9, 2021

(65) Prior Publication Data

US 2021/0296025 A1    Sep. 23, 2021

(30) Foreign Application Priority Data

Mar. 19, 2020  (JP) .............................. JP2020-049327

(51) Int. Cl.
*H01B 7/42* (2006.01)
*B60R 16/02* (2006.01)
*H01B 7/18* (2006.01)
*H01B 7/00* (2006.01)

(52) U.S. Cl.
CPC ......... *H01B 7/421* (2013.01); *B60R 16/0215* (2013.01); *H01B 7/0045* (2013.01); *H01B 7/1805* (2013.01)

(58) Field of Classification Search
CPC . B60R 16/0215; B60R 16/02; B60R 16/0207; B60R 16/0222; H01B 7/0045; H01B 7/1805; H01B 7/228
See application file for complete search history.

(56) References Cited

U.S. PATENT DOCUMENTS

| | | | |
|---|---|---|---|
| 9,912,132 B2 | 3/2018 | Kuroishi et al. | |
| 10,320,165 B2 | 6/2019 | Kuroishi et al. | |
| 2004/0099428 A1* | 5/2004 | Miyazaki | H01R 13/655 174/366 |
| 2013/0299234 A1* | 11/2013 | Izawa | H02G 3/0406 174/70 R |
| 2014/0190744 A1* | 7/2014 | Fuzioka | H02G 3/088 174/77 R |
| 2018/0037176 A1* | 2/2018 | Kodama | H01B 7/2825 |
| 2020/0156566 A1* | 5/2020 | Shimizu | H01R 4/64 |

FOREIGN PATENT DOCUMENTS

| | | | | |
|---|---|---|---|---|
| JP | 2017-117863 A | | 6/2017 | |
| JP | 2018182849 A | * | 11/2018 | .............. F16L 3/137 |
| WO | WO-2018168831 A1 | * | 9/2018 | ......... H01R 13/6592 |

* cited by examiner

*Primary Examiner* — Paresh Paghadal
(74) *Attorney, Agent, or Firm* — Oliff PLC

(57) ABSTRACT

A wire harness including: a wire; a cover that covers the wire; and a braid made of resin that covers the wire, wherein: the wire protrudes from a first end of the cover to an outside of the cover, and a space is formed between the wire and the first end, and the braid is provided at a position that overlaps the first end of the cover in a longitudinal direction of the wire and is exposed to the outside of the cover.

5 Claims, 5 Drawing Sheets

WIRE HARNESS

BACKGROUND

The present disclosure relates to a wire harness.

A shielded conductive path is routed between a battery and an inverter device in a vehicle such as an electric automobile (see JP 2017-117863A, for example). This shielded conductive path includes a conductive path main body formed by bundling a plurality of coated wires into the form of a harness, and a corrugated tube made of a synthetic resin.

SUMMARY

In a case of such a shielded conductive path (referred to as a "wire harness" hereinafter) in which a protective member such as a corrugated tube is attached to wires, heat generated by the wires to which electric current is being applied may be trapped inside the protective member. Accordingly, the temperature of the wire harness is likely to rise compared with a case where a protective member is not attached to wires.

An exemplary aspect of the disclosure provides a wire harness capable of suppressing a rise in the temperature thereof.

A wire harness of the present disclosure includes a wire; a cover that covers the wire; and a braid made of resin that covers the wire, wherein the wire protrudes from a first end of the cover to an outside of the cover, and a space is formed between the wire and the first end, and the braid is provided at a position that overlaps the first end of the cover in a longitudinal direction of the wire and is exposed to the outside of the cover.

With the present disclosure, a rise in temperature of a wire harness can be suppressed.

DETAILED DESCRIPTION OF EMBODIMENTS

Figure 1:
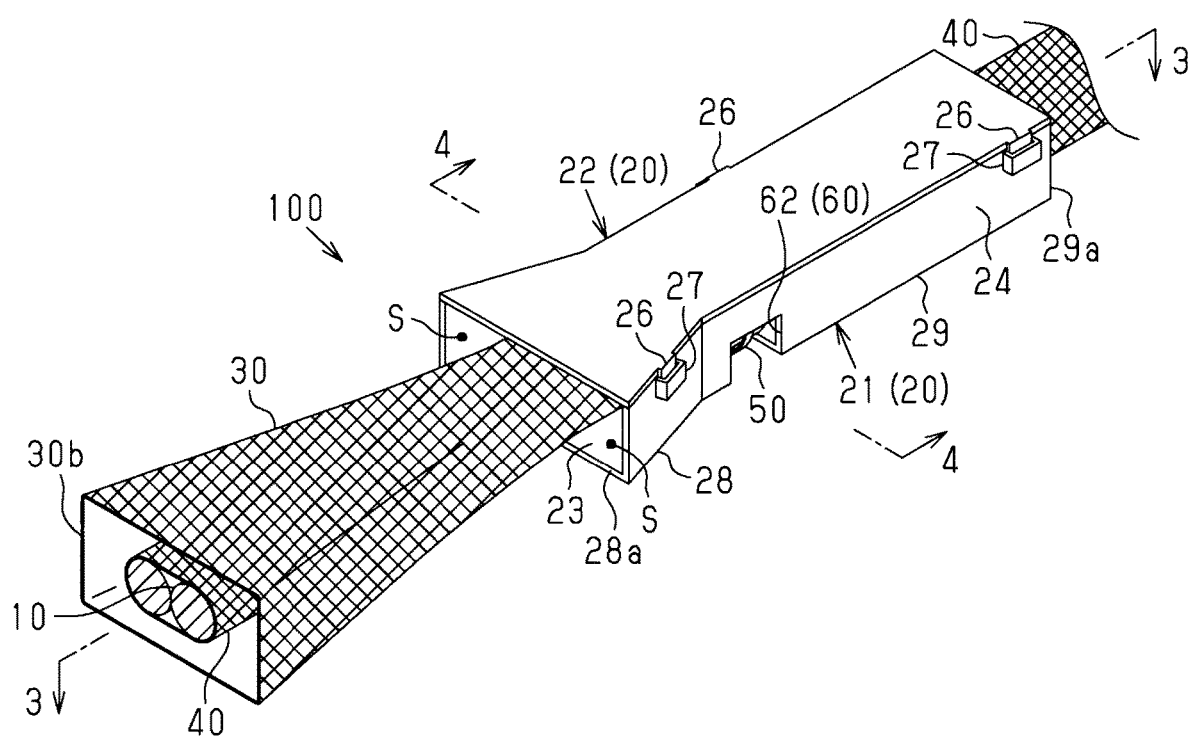
FIG. 1 is a perspective view showing an embodiment of a wire harness.

Description of Embodiments of the Present Disclosure

First, embodiments of the present disclosure will be listed and described.

A wire harness of the present disclosure is (1) a wire harness including a wire; a protective member that covers the wire; and a braided member made of resin that covers the wire, wherein the wire protrudes from a first end of the protective member to the outside of the protective member, and a space is formed between the wire and the first end, and the braided member is provided at a position that overlaps the first end of the protective member in a longitudinal direction of the wire and is exposed to the outside of the protective member.

With this configuration, the wire protrudes from the first end of the protective member toward the outside of the protective member, and a space is formed between the wire and the first end. The braided member made of resin that covers the wire is provided at the position overlapping the first end of the protective member in the longitudinal direction of the wire and is exposed to the outside of the protective member. Accordingly, heat generated by the wire to which electric current is being applied is transferred through the meshes of the braided member to the space between the first end of the protective member and the wire and is then dissipated from that space to the outside of the protective member. This makes it possible to inhibit heat generated by the wire from being trapped inside the protective member. Therefore, a rise in temperature of the wire harness can be suppressed.

(2) It is preferable that when an area of a cross section orthogonal to the longitudinal direction of the protective member is defined as a cross-sectional area, the cross-sectional area at the first end is larger than the cross-sectional area of at least one intermediate portion in the longitudinal direction of the protective member.

With this configuration, the first end of the protective member has a larger cross-sectional area, and thus the space between the first end and the wire increases in size. Accordingly, heat generated by the wire is further dissipated to the outside of the protective member. Therefore, a rise in temperature of the wire harness can be further suppressed.

(3) It is preferable that the cross-sectional area of an end portion of the protective member including the first end increases toward the first end.

With this configuration, the end portion of the protective member including the first end has an even larger cross-sectional area, and thus the space between the end portion including the first end and the wire increases in size. Accordingly, heat generated by the wire is effectively dissipated to the outside of the protective member. Therefore, a rise in temperature of the wire harness can be even further suppressed.

(4) It is preferable that a portion of the braided member that overlaps the first end is arranged between an inner surface of the protective member and an outer surface of the wire.

With this configuration, the body size of the wire harness can be reduced compared with a configuration in which a portion of the braided member that overlaps the first end is arranged on the outer side of the protective member.

(5) It is preferable that a band-shaped fixation member for fixing the wire to the protective member is provided, the fixation member is collectively wound around the protective member and the wire, and the protective member is provided with holes through which the fixation member is passed.

With this configuration, positional shift of the wire relative to the protective member can be suppressed even if the protective member has a high rigidity.

Also, with the above-mentioned configuration, heat generated by the wire is dissipated through the holes of the protective member to the outside of the protective member. Therefore, a rise in temperature of the wire harness can be even further suppressed.

(6) It is preferable that the fixation member is a binding band, the holes include a first hole and a second hole, the protective member includes a winding-target portion that is located between the first hole and the second hole and around which the fixation member is wound, and two ends of the winding-target portion are located between the outermost antipodal points of the wire in a direction in which the first hole, the winding-target portion, and the second hole are lined up.

With this configuration, in the direction in which the first hole, the winding-target portion, and the second hole are lined up in the protective member, the two ends of the winding-target portion are located between the outermost antipodal points of the wire, thus making it possible to increase area of contact between the binding band and the wire. Therefore, the positional shift of the wire relative to the protective member can be further suppressed.

(7) It is preferable that the binding band is collectively wound around the protective member and a portion of the wire that is covered by the braided member, and a tape member is arranged on a portion of the braided member around which the binding band is wound.

With this configuration, the binding band bites into the tape member arranged on the braided member, thus making it possible to suppress the positional shift of the binding band relative to the braided member.

(8) It is preferable that, when the braided member is defined as a first braided member, a second braided member made of metal is arranged between the first braided member and the wire, and a tape member made of resin is arranged between the second braided member and the first braided member.

With this configuration, the second braided member made of metal electromagnetically shields the wire.

Incidentally, in a configuration in which a wire covered by a second braided member made of metal is covered by a first braided member made of resin, frictional resistance decreases compared with a configuration in which the second braided member is not provided, thus making it likely that the first braided member slides over the second braided member and the positional shift occurs.

To address this, with the above-mentioned configuration, the tape member made of resin is arranged between the second braided member and the first braided member. The tape member made of resin has a larger frictional resistance compared with the second braided member made of metal. Accordingly, the second braided member and the first braided member are less likely to slide over the tape member. Therefore, the positional shift of the first braided member relative to the second braided member can be suppressed.

Details of Embodiment of the Present Disclosure

The following describes specific embodiments of a wire harness of the present disclosure with reference to the drawings. A portion of the configuration may be exaggerated or simplified for illustrative reasons in the diagrams. In addition, the ratios between the dimensions shown in the diagrams may be different from each other. It should be noted that the present disclosure is not limited to these embodiments and is defined by the scope of the appended claims, and all changes that fall within the same essential spirit as the scope of the claims are intended to be included therein. The terms "parallel" and "orthogonal" as used herein encompass not only "precisely parallel" and "precisely orthogonal" but also "substantially parallel" and "substantially orthogonal", as long as the functions and effects of these embodiments are exhibited.

Overall Configuration of Wire Harness 100

As shown in FIGS. 1 to 4, a wire harness 100 includes wires 10, a protective member 20 (cover) with an elongated tubular shape that covers the wires 10, a first braided member 30 (first braid) made of resin, and a second braided member 40 (second braid) made of metal.

The wire harness 100 also includes a band-shaped fixation member 50 (band) for fixing the wires 10 to the protective member 20.

Configuration of Wire 10

Connectors (not shown) are attached to the end portions on the two sides of the wires 10, and devices (not shown) such as an inverter and a motor installed in a vehicle are electrically connected using the wires 10, for example. In this embodiment, two wires 10 are routed side by side.

Each of the wires 10 includes a conductive core wire (not shown), and an insulating coating made of resin (not shown) that covers the outer circumference of the core wire.

Configuration of Second Braided Member 40

The following describes the second braided member 40.

Figure 2:
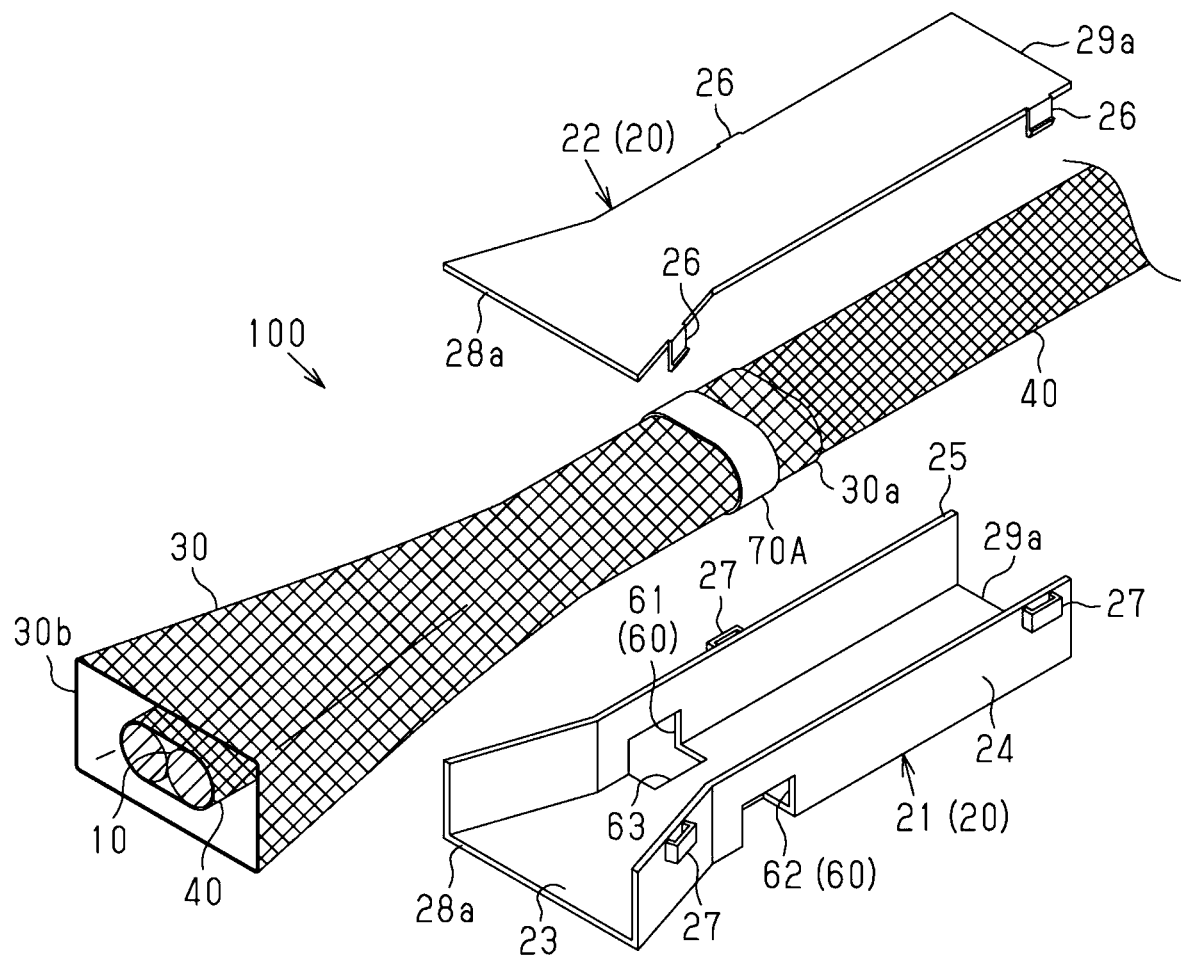
FIG. 2 is an exploded perspective view showing the wire harness of the embodiment.

As shown in FIGS. 1 and 2, the second braided member 40 is a tubular mesh member obtained by braiding a plurality of metal strands. The second braided member 40 functions as an electromagnetic shield, and reduces noise caused by the wire harness 100. The second braided member 40 collectively covers the entire length of the two wires 10.

Configuration of First Braided Member 30

The following describes the first braided member 30.

As shown in FIGS. 1 and 2, the first braided member 30 is a tubular mesh member obtained by braiding a plurality of resin strands. The first braided member 30 protects the wires 10 such that the wires 10 do not come into contact with other members. The first braided member 30 covers the second braided member 40. That is, the first braided member 30 collectively covers the two wires 10. Specifically, the first braided member 30 covers a portion of the second braided member 40 in the longitudinal direction of the wires 10.

A portion of the first braided member 30 including one end 30a has a uniform cross-sectional shape in the longitudinal direction of the wires 10, whereas the length of the first braided member 30 in the direction in which the wires 10 are lined up (referred to as a "width direction" hereinafter) increases toward the other end 30b. That is, the cross-sectional area of the first braided member 30 increases toward the other end 30b. It should be noted that the other end 30b is fixed to a grommet (not shown) to which the connector (not shown) attached to end portions of the wires 10 is externally fitted.

Figure 3:
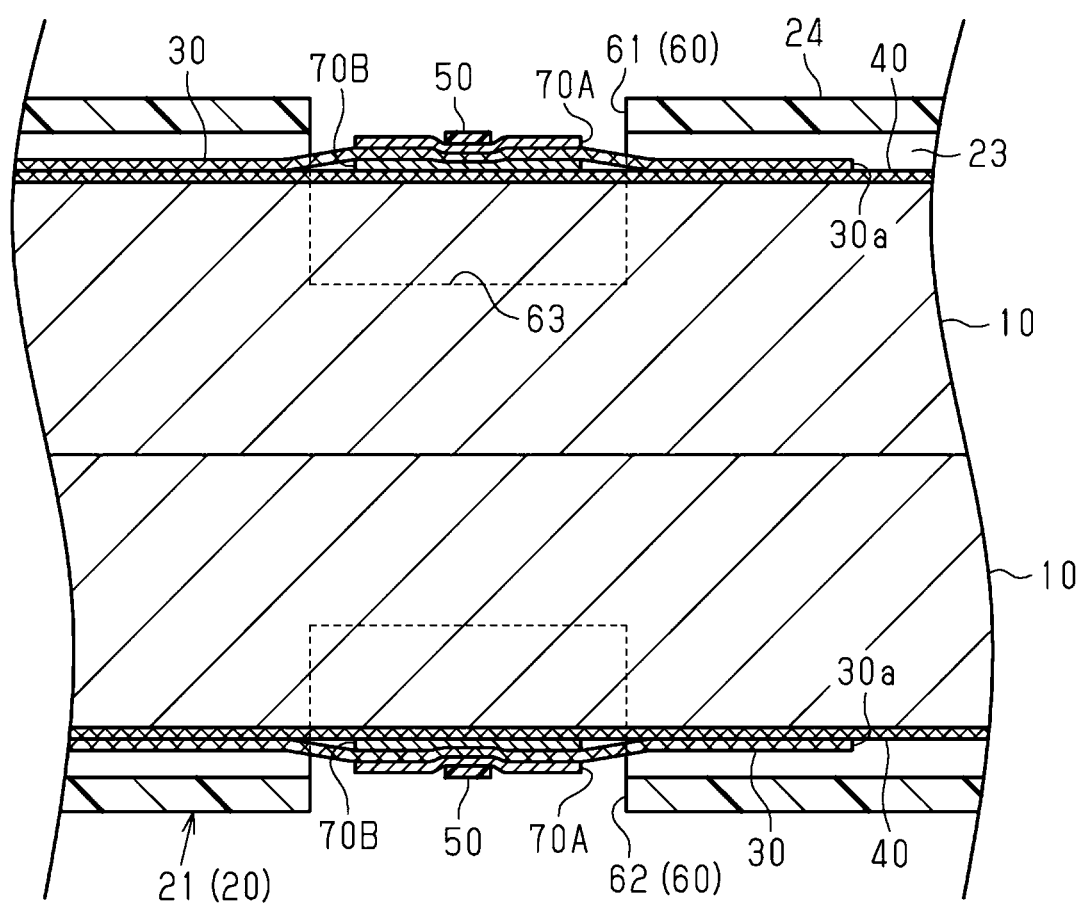
FIG. 3 is a cross-sectional view taken along line 3-3 in FIG. 1.
Figure 4:
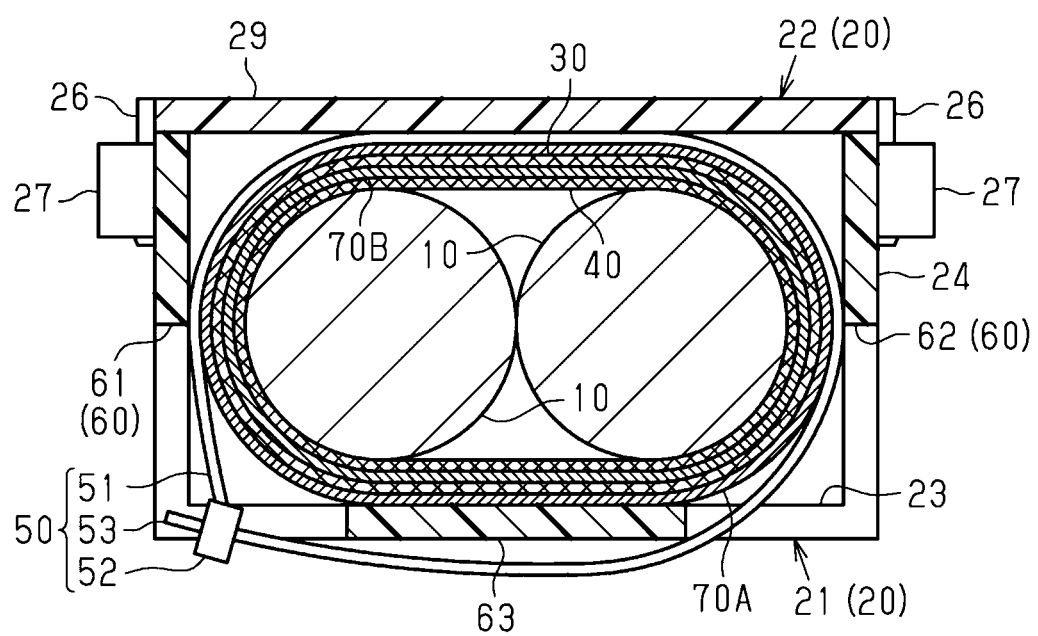
FIG. 4 is a cross-sectional view taken along line 4-4 in FIG. 1.

As shown in FIGS. 3 and 4, a tape member 70B (tape) made of resin is arranged over the entire circumference of a portion between the second braided member 40 and the first braided member 30.

As shown in FIGS. 2 to 4, a tape member 70A made of resin is arranged on the outer circumferential surface of the first braided member 30 over the entire circumference thereof. The tape member 70A is arranged at the same position as the position of the tape member 70B in the longitudinal direction of the wires 10.

Configuration of Protective Member 20

As shown in FIG. 2, the protective member 20 includes: a main body portion 21 with a recessed cross-sectional shape that includes a bottom wall 23 on which the first braided member 30 and the second braided member 40, which cover the wires 10, are placed, and two side walls 24 that extend from the two side edges of the bottom wall 23 and are orthogonal to the bottom wall 23; and a plate-like lid portion 22 that covers an opening 25 located between the protruding ends of the two side walls 24. The protective member 20 protects the wires 10 from flying stones, water splashes, and the like.

It should be noted that the main body portion 21 and the lid portion 22 may be formed using various materials such as resin materials and metal materials. In this embodiment, the main body portion 21 and the lid portion 22 are formed by molding a resin material such as polypropylene (PP). In this case, the weights of the main body portion 21 and the lid portion 22 can be easily reduced compared with a case where another material such as a metal material is used.

As shown in FIGS. 1 and 2, the protective member 20 includes a first end 28a and a second end 29a.

A portion including the second end 29a (referred to as a "base portion 29" hereinafter) has a flattened rectangular shape and has a uniform cross-sectional shape in the longitudinal direction.

In the following description, the area of a cross section orthogonal to the longitudinal direction of the protective member 20 is defined as a cross-sectional area.

On the other hand, in a portion including the first end 28a (referred to as a "widened portion 28" hereinafter), the length in the width direction increases toward the first end 28a, and thus the cross-sectional area increases. That is, the cross-sectional area at the first end 28a is larger than the cross-sectional area of at least one intermediate portion in the longitudinal direction of the protective member 20. Accordingly, in the protective member 20, a space S is formed between the widened portion 28 and the wires 10.

The lid portion 22 includes locking-target portions 26 provided at the two side edges in the width direction thereof. Locking portions 27 are provided at positions on the side walls 24 of the main body portion 21 that are opposed to the locking-target portions 26. The lid portion 22 is attached to the main body portion 21 by locking the locking-target portions 26 to the locking portions 27. As a result, portions of the wires 10 in the extension direction are covered by the bottom wall 23, the two side walls 24, and the lid portion 22 from four sides. It should be noted that, in this embodiment, three locking-target portions 26 and three locking portions 27 are provided.

As shown in FIG. 1, portions of the wires 10 covered by both of the braided members 30 and 40 protrude from the first end 28a of the protective member 20 to the outside of the protective member 20. Portions of the wires 10 that are not covered by the first braided member 30 and are covered by the second braided member 40 protrude from the second end 29a of the protective member 20 to the outside of the protective member 20.

Accordingly, the first braided member 30 is arranged between the inner surface of the protective member 20 and the outer surfaces of the wires 10 covered by the second braided member 40 at a position overlapping the first end 28a of the protective member 20.

As shown in FIGS. 1 to 4, the protective member 20 is provided with holes 60 through which the fixation member 50 for fixing the wires 10 to the protective member 20 is passed.

The holes 60 include a first hole 61 and a second hole 62 that are provided in the base portion 29 of the protective member 20.

The first hole 61 is formed extending from one of the side walls 24 to the bottom wall 23 in the main body portion 21.

The second hole 62 is formed extending from the other of the side walls 24 to the bottom wall 23 in the main body portion 21.

The first hole 61 and the second hole 62 are opposed to each other in the width direction.

The bottom wall 23 of the main body portion 21 includes a winding-target portion 63 that is located between the first hole 61 and the second hole 62 and around which the fixation member 50 is wound.

As shown in FIG. 4, the fixation member 50 is a so-called binding band, and includes a band portion 51, a head portion 52 provided at the leading end of the band portion 51, and a tail portion 53 provided at the base end of the band portion 51.

As shown in FIG. 3, the fixation member 50 is collectively wound around the protective member 20 and a portion of the first braided member 30, which covers the wires 10, on which the tape member 70A is arranged, and thus the wires 10 are fixed to the protective member 20. The width of the band portion 51 is smaller than those of the tape members 70A and 70B. The fixation member 50 is wound around the central position of the tape members 70A and 70B in the longitudinal direction of the wires 10.

As shown in FIG. 4, in the width direction of the protective member 20, namely the direction in which the first hole 61, the winding-target portion 63, and the second hole 62 are lined up, the two ends of the winding-target portion 63 are located between the outermost antipodal points of the two wires 10. It should be noted that, in the width direction of the protective member 20, the outermost antipodal points of the two wires 10 are located at the outermost positions.

The following describes the functions and the effects of this embodiment.

(1) The wires 10 protrude from the first end 28a of the protective member 20 toward the outside of the protective member 20, and the space S is formed between the wires 10 and the first end 28a. The first braided member 30 is provided at the position overlapping the first end 28a of the protective member 20 in the longitudinal direction of the wires 10 and is exposed to the outside of the protective member 20.

With such a configuration, the wires 10 protrudes from the first end 28a of the protective member 20 toward the outside of the protective member 20, and the space S is formed between the wires 10 and the first end 28a. The first braided member 30 made of resin that covers the wires 10 is provided at the position overlapping the first end 28a of the protective member 20 in the longitudinal direction of the wires 10 and is exposed to the outside of the protective member 20. Accordingly, heat generated by the wires 10 to which electric current is being applied is transferred through the meshes of the first braided member 30 to the space S between the first end 28a of the protective member 20 and the wires 10 and is then dissipated from the space S to the outside of the protective member 20. This makes it possible to inhibit heat generated by the wires 10 from being trapped inside the protective member 20. Therefore, a rise in temperature of the wire harness 100 can be suppressed.

(2) When the area of a cross section orthogonal to the longitudinal direction of the protective member 20 is defined as a cross-sectional area, the cross-sectional area at the first end 28a is larger than the cross-sectional area of at least one intermediate portion in the longitudinal direction of the protective member 20.

With such a configuration, the first end 28a of the protective member 20 has a larger cross-sectional area, and thus the space between the first end 28a and the wires 10 increases in size. Accordingly, heat generated by the wires 10 is further dissipated to the outside of the protective member 20. Therefore, a rise in temperature of the wire harness 100 can be further suppressed.

(3) The cross-sectional area of the widened portion 28 increases toward the first end 28a.

With such a configuration, the widened portion 28 of the protective member 20 has an even larger cross-sectional area, and thus the space between the widened portion 28 and the wires 10 increases in size. Accordingly, heat generated by the wires 10 is effectively dissipated to the outside of the protective member 20. Therefore, a rise in temperature of the wire harness 100 can be even further suppressed.

On the other hand, the wires 10 may abut against or rub against the first end 28a of the protective member 20 due to vibration of a vehicle while the vehicle is traveling. This causes wear of the first braided member 30, which is disadvantageous.

To address this, with the above-mentioned configuration, the wires 10 is inhibited from abutting against the first end 28a of the protective member 20. Accordingly, wear of the first braided member 30 caused by the protective member is suppressed.

(4) A portion of the first braided member 30 that overlaps the first end 28a is arranged between the inner surface of the protective member 20 and the outer surfaces of the wires 10.

With such a configuration, the body size of the wire harness 100 can be reduced compared with a configuration in which a portion of the first braided member 30 that overlaps the first end 28a is arranged on the outer side of the protective member 20.

(5) The band-shaped fixation member 50 for fixing the wires 10 to the protective member 20 is provided and is collectively wound around the protective member 20 and the wires 10, and the holes 60 through which the fixation member 50 is passed are formed in the protective member 20.

With such a configuration, positional shift of the wires 10 relative to the protective member 20 can be suppressed even if the protective member 20 has a high rigidity.

Also, with the above-mentioned configuration, heat generated by the wires is dissipated through the holes 60 of the protective member 20 to the outside of the protective member 20. Therefore, a rise in temperature of the wire harness 100 can be even further suppressed.

(6) In the direction in which the first hole 61, the winding-target portion 63, and the second hole 62 are lined up, the two ends of the winding-target portion 63 are located between the outermost antipodal points of the two wires 10.

With such a configuration, in the direction in which the first hole 61, the winding-target portion 63, and the second hole 62 are lined up in the protective member 20, the two ends of the winding-target portion 63 are located between the outermost antipodal points of the two wires 10, thus making it possible to increase area of contact between the binding band and the wires 10. Therefore, the positional shift of the wires 10 relative to the protective member 20 can be further suppressed.

Incidentally, in a configuration in which a tape member is used to fix the protective member 20 and the wires 10, for example, in order to secure a tightening force equal to that obtained in a configuration in which a binding band is used to fix the protective member 20 and the wires 10, it is necessary to wind a tape member with a width larger than that of a binding band a plurality of times.

Accordingly, with the above-mentioned configuration, the fixing operation can be performed more easily compared with the configuration in which a tape member is used to fix the protective member 20 and the wires 10.

Also, with the above-mentioned configuration, the sizes of the first hole 61 and the second hole 62 can be reduced compared with the configuration in which a tape member is used to fix the protective member 20 and the wires 10. Therefore, it is possible to suppress a decrease in strength of the protective member 20 due to the formation of the first hole 61 and the second hole 62.

(7) The binding band is collectively wound around the protective member 20 and portions of the wires 10 that are covered by the first braided member 30, and the tape member 70A is arranged on a portion of the first braided member 30 around which the binding band is to be wound.

With such a configuration, the binding band bites into the tape member 70A arranged on the first braided member 30, thus making it possible to suppress the positional shift of the binding band relative to the first braided member 30.

(8) The second braided member 40 made of metal is arranged between the first braided member 30 and the wires 10, and the tape member 70B made of resin is arranged between the second braided member 40 and the first braided member 30.

With such a configuration, the second braided member 40 made of metal electromagnetically shields the wires 10.

Incidentally, in a configuration in which the wires 10 covered by the second braided member 40 made of metal is covered by the first braided member 30 made of resin, frictional resistance decreases compared with a configuration in which the second braided member 40 is not provided, thus making it likely that the first braided member 30 slides over the second braided member 40 and the positional shift occurs.

To address this, with the above-mentioned configuration, the tape member 70B made of resin is arranged between the second braided member 40 and the first braided member 30. The tape member 70B made of resin has a larger frictional resistance compared with the second braided member 40 made of metal. Accordingly, the second braided member 40 and the first braided member 30 are less likely to slide over the tape member 70B. Therefore, the positional shift of the first braided member 30 relative to the second braided member 40 can be suppressed.

Modified Examples

This embodiment can be implemented with various modifications as follows. This embodiment and the following modified examples can be used in combination with each other as long as they are compatible with each other.

Although the number of wires 10 is two in the example shown in this embodiment, the number of wires 10 is not limited thereto and can be changed as appropriate. That is, the number of wires 10 may be one, or three or more wires may be provided.

One or both of the tape members 70A and 70B may be omitted.

The second braided member 40 need not cover the entire length of the wires 10. That is, the second braided member 40 may cover portions of the wires in the extension direction. In addition, there is no limitation to the configuration in which the second braided member 40 collectively covers a plurality of wires 10, and a plurality of wires 10 may also be individually covered.

The second braided member 40 may be omitted. In this case, the first braided member 30 may cover the entire length of the wires 10, for example.

The fixation member 50 is not limited to a binding band shown as an example in this embodiment, and a tape member made of resin may also be used, for example.

Figure 5:
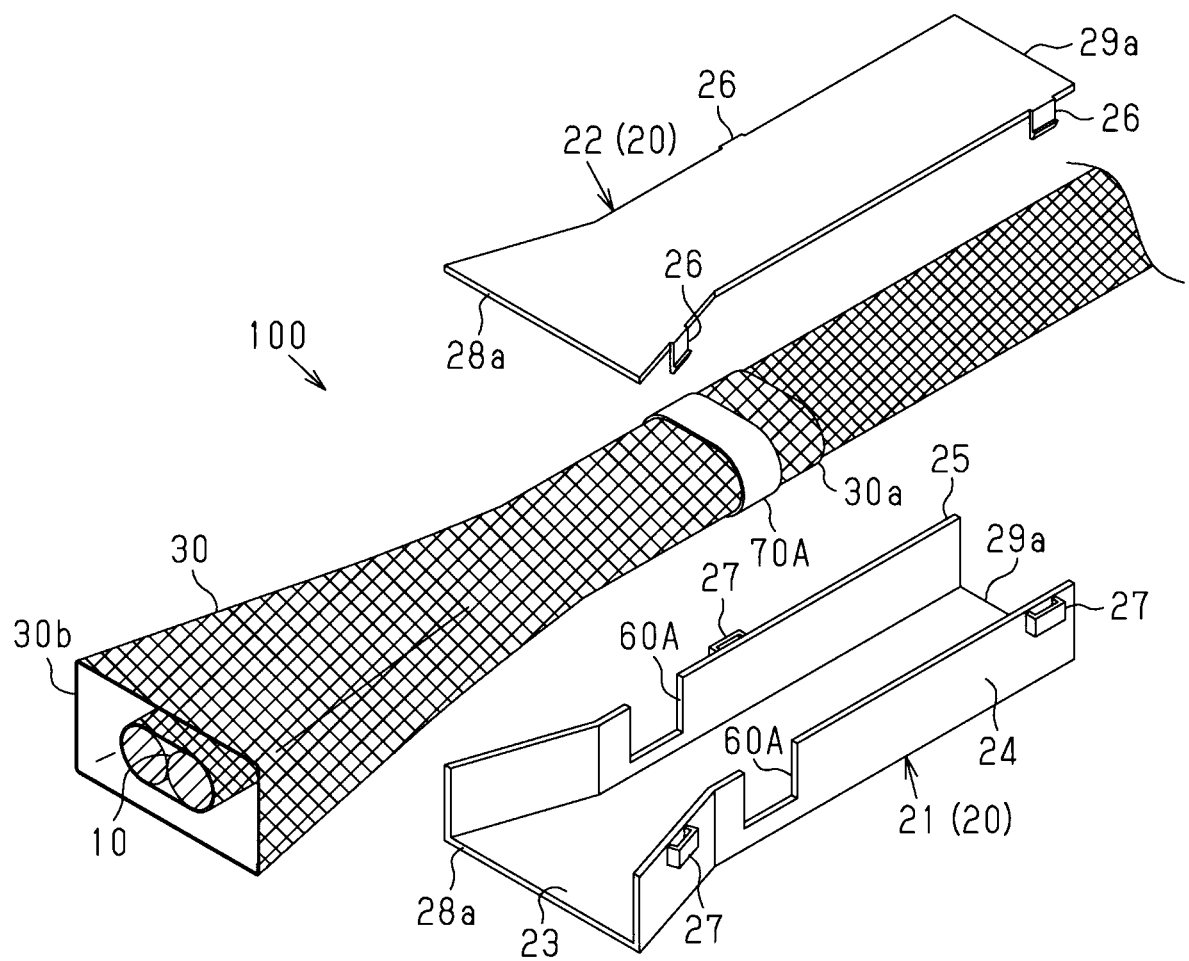
FIG. 5 is a perspective view showing a variation of a protective member.

In the protective member 20, the shape of the portion through which the fixation member 50 is to be passed is not limited to the holes 60, and may also be cutout portions 60A that are provided in the side walls 24 of the main body portion 21 so as to be opposed to each other in the width direction of the protective member 20 as shown in FIG. 5, for example. In this case, the shape of the winding-target portion is not limited to that shown as an example in this embodiment, and a configuration may also be employed in which the two ends of the winding-target portion are located at the same positions as those of the two ends of the wires 10 or are located on the outer side of the two ends of the wires 10 in the width direction, for example.

There is no limitation to the configuration in which the portion of the first braided member 30 that overlaps the first end 28a is arranged between the inner surface of the protective member 20 and the outer surfaces of the wires 10, and that portion may also be arranged on the outer surface of the protective member 20.

One end 30a of the first braided member 30 may protrude from the second end 29a of the protective member 20 and be exposed to the outside.

The widened portion 28 of the protective member 20 need not have a shape in which the cross-sectional area of the widened portion 28 increases toward the first end 28a. That is, the shape of the widened portion 28 may also be changed as appropriate (for example, into a shape with a uniform width) as long as the cross-sectional area of the first end 28a is larger than the cross-sectional area of at least one intermediate portion in the longitudinal direction of the protective member 20.

The shape of the protective member 20 is not limited to that shown as an example in this embodiment. That is, although the first end 28a of the protective member 20 has a shape in which the space S is formed between the first end 28a and the wires 10 in this embodiment, a configuration may also be employed in which both the first end 28a and the second end 29a have such a shape. In addition, there is no limitation to the configuration in which the protective member 20 includes two ends, and the protective member 20 may also include three or more ends through which wires are passed, for example. In this case, it is sufficient that at least one of the plurality of ends has a shape in which the space S is formed between the end and the wires 10.

There is no limitation to the configuration in which the protective member shown as an example in this embodiment is used, and an elongated tubular corrugated tube may also be used.

What is claimed is:

1. A wire harness comprising:
a wire;
a cover that covers the wire;
a braid made of resin that covers the wire; and
a band that fixes the wire to the cover, wherein:
the wire protrudes from a first end of the cover to an outside of the cover, and a space is formed between the wire and the first end, and
the braid is provided at a position that overlaps the first end of the cover in a longitudinal direction of the wire and is exposed to the outside of the cover,
the band is collectively wound around the cover and the wire,
the cover is provided with holes through which the band is passed,
the band is a binding band,
the holes include a first hole and a second hole,
the cover includes a winding-target portion that is located between the first hole and the second hole and around which the band is wound,
two ends of the winding-target portion are located between the outermost antipodal points of the wire in a direction in which the first hole, the winding-target portion, and the second hole are lined up,
the binding band is collectively wound around the cover and a portion of the wire that is covered by the braid, and
a tape is arranged on a portion of the braid around which the binding band is wound.

2. The wire harness according to claim 1, wherein:
an area of a cross section orthogonal to the longitudinal direction of the cover is defined as a cross-sectional area,
the cross-sectional area at the first end is larger than the cross-sectional area of at least one intermediate portion in the longitudinal direction of the cover.

3. The wire harness according to claim 2,
wherein the cross-sectional area of an end portion of the cover including the first end increases toward the first end.

4. The wire harness according to claim 1,
wherein a portion of the braid that overlaps the first end is arranged between an inner surface of the cover and an outer surface of the wire.

5. The wire harness according to claim 1, wherein:
the braid is defined as a first braid,
a second braid made of metal is arranged between the first braid and the wire, and
a tape made of resin is arranged between the second braid and the first braid.

* * * * *